United States Patent
Hammam et al.

(10) Patent No.: US 12,335,143 B2
(45) Date of Patent: Jun. 17, 2025

(54) NETWORK NODE UNIT, A RECEIVING ELEMENT AND METHODS THEREIN FOR MANAGING PACKET HANDLING AND PACKETS

(71) Applicant: Telefonaktiebolaget LM Ericsson (publ), Stockholm (SE)

(72) Inventors: Tarik Hammam, Kista (SE); Anders Franzen, Trångsund (SE); János Kövér, Johanneshov (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 25 days.

(21) Appl. No.: 18/013,617

(22) PCT Filed: Jul. 15, 2020

(86) PCT No.: PCT/SE2020/050734
§ 371 (c)(1),
(2) Date: Dec. 29, 2022

(87) PCT Pub. No.: WO2022/015212
PCT Pub. Date: Jan. 20, 2022

(65) Prior Publication Data
US 2023/0291689 A1    Sep. 14, 2023

(51) Int. Cl.
*H04L 45/42*       (2022.01)
*H04L 45/7453*     (2022.01)
*H04L 49/109*      (2022.01)

(52) U.S. Cl.
CPC .......... *H04L 45/7453* (2013.01); *H04L 45/42* (2013.01); *H04L 49/109* (2013.01)

(58) Field of Classification Search
CPC ....... H04L 45/00; H04L 45/021; H04L 45/42; H04L 45/48; H04L 45/54; H04L 45/457;
(Continued)

(56) References Cited

U.S. PATENT DOCUMENTS

| | | | | |
|---|---|---|---|---|
| 5,434,863 A | * | 7/1995 | Onishi ................... | H04L 12/66 370/402 |
| 6,011,795 A | * | 1/2000 | Varghese ............ | H04L 61/4552 709/245 |

(Continued)

OTHER PUBLICATIONS

Kaljic et al., "A Survey on Data Plane Flexibility and Programmability in Software-Defined Networking", IEEE Access, IEEE, USA, Apr. 19, 2019, vol. 7, pp. 47804-47840.

(Continued)

*Primary Examiner* — James N Fiorillo
(74) *Attorney, Agent, or Firm* — Sage Patent Group (57) ABSTRACT

According to embodiments herein e.g. a method performed by a network node unit for managing packet handling in a communications network is provided. The network node unit reads through routing entries in a routing information base. The network node unit performs for one or more routing entries, a hash process on a network address of the routing entry into a hashed network address associated with an identity of a forwarding unit. The network node unit sends information relating to the routing entry to the forwarding unit with the identity thereby partitioning the routing entries to different forwarding units e.g. targeted by a correlated traffic distribution mechanism.

15 Claims, 9 Drawing Sheets

(58) Field of Classification Search
CPC ... H04L 45/586; H04L 45/655; H04L 45/741; H04L 45/742; H04L 45/748; H04L 45/7453; H04L 45/7457; H04L 69/22; H04L 45/22; H04L 45/44; H04L 45/745; H04L 49/109; G06F 17/3033; G06F 17/30339; G06F 12/0864
USPC .......................................................... 709/238
See application file for complete search history.

(56) References Cited

U.S. PATENT DOCUMENTS

| | | | | |
|---|---|---|---|---|
| 6,754,662 | B1* | 6/2004 | Li | G06F 16/9014 |
| | | | | 707/693 |
| 8,139,576 | B2* | 3/2012 | Sugai | H04L 45/583 |
| | | | | 370/389 |
| 8,938,469 | B1* | 1/2015 | Keen | H04L 45/7453 |
| | | | | 711/216 |
| 10,135,734 | B1* | 11/2018 | Singh | H04L 45/7453 |
| 10,397,115 | B1* | 8/2019 | Hasani | H04L 45/7453 |
| 12,079,129 | B2* | 9/2024 | Favor | G06F 12/1063 |
| 2011/0026403 | A1* | 2/2011 | Shao | H04L 67/1001 |
| | | | | 370/235 |
| 2012/0243544 | A1* | 9/2012 | Keesara | H04L 12/4633 |
| | | | | 370/395.53 |
| 2013/0301522 | A1* | 11/2013 | Krishna | H04L 45/745 |
| | | | | 370/328 |
| 2017/0046342 | A1* | 2/2017 | Azgin | H04L 45/748 |
| 2017/0171362 | A1* | 6/2017 | Bolotov | H04L 63/0263 |
| 2018/0083868 | A1* | 3/2018 | Cheng | H04L 45/44 |
| 2018/0287941 | A1* | 10/2018 | Louzoun | H04L 45/745 |
| 2019/0075053 | A1* | 3/2019 | Yu | H04L 45/748 |
| 2019/0222504 | A1* | 7/2019 | Kananda | H04L 45/38 |
| 2019/0280975 | A1* | 9/2019 | Sharif | H04L 45/748 |
| 2019/0294549 | A1* | 9/2019 | Levy | H04L 45/742 |

OTHER PUBLICATIONS

Shi Shouqian et al., "Re-designing Compact-structure based Forwarding for Programmable Networks", 2019 IEEE 27th International Conference on Network Protocols (ICNP), Oct. 8, 2019, IEEE, pp. 1-11.

Waldvogel et al., "Scalable High Speed IP Routing Lookups," ACM SIGCOMM, Computer Communication Review, vol. 27, Issue 4, Oct. 1997, pp. 25-36.

Li Jie et al., "SVDR: A scalable virtual domain-based routing scheme for CCN", Computer Networks 143 (2018), pp. 206-220.

International Search Report and Written Opinion of the International Searching Authority for PCT International Application No. PCT/SE2020/050734 dated May 14, 2021.

European Search Report for European Patent Application No. 20944878.6 dated Mar. 14, 2024, 9 pages.

* cited by examiner

NETWORK NODE UNIT, A RECEIVING ELEMENT AND METHODS THEREIN FOR MANAGING PACKET HANDLING AND PACKETS

CROSS-REFERENCE TO RELATED APPLICATION

This application is a 35 U.S.C. § 371 national stage application of PCT International Application No. PCT/SE2020/050734 filed Jul. 15, 2020, the contents of which are hereby incorporated by reference herein.

TECHNICAL FIELD

Embodiments herein relate to a network node unit, a receiving element and methods performed therein in a communications network. Furthermore, a computer program product and a computer readable storage medium are also provided herein. In particular, embodiments herein relate to managing how to handle packets in the communications network.

BACKGROUND

In a typical communications network, electronic devices such as wireless terminals, also known as mobile stations and/or user equipments (UEs), communicate packets via e.g. a Radio Access Network (RAN) to one or more core networks (CN). The RAN covers a geographical area which is divided into cell areas, with each cell area being served by a base station, e.g., a radio base station (RBS), which in some networks may also be called, for example, a "NodeB" or "eNodeB". Packets are transported in the communications network such as in the RAN as well as in a Core Network along paths in a transport network. Traffic engineering solutions are focusing on reserving capacity to flows and are more suited to provide bandwidth guarantees, and path computation can be potentially very complicated if we want to utilize alternative paths for higher utilization. Also, robustness is usually achieved by reserving an alternative path, which is a waste of resources. Transport equipment usually has very limited packet processing capabilities. A few priority or weighted fair queues, a few levels of drop precedence is what are usually available, since emphasis is on high throughput and low price per bit.

The packets are transported and routed over network nodes, such as switches and/or routers, in the communications network according to a routing system. Routing systems using multiple forwarding elements have been described in e.g. RFC 3746 Forwarding and Control Element Separation (ForCES) framework. In such systems routing information is typically held in a Routing Information Base (RIB) on a Control Element (CE) from where routing data is down-loaded to a set of forwarding units (FU) also denoted as forwarding elements (FE), each having an own Forwarding information Base (FIB). Moreover, it is well known to a person familiar with the art that using multiple forwarding elements (FEs) equipped with own hardware (HW) processing resources can improve forwarding capacity. It is also well known that per-packet, fast look-up speed in the FIB of a forwarder is an important factor for achieving a high forwarding capacity.

It is furthermore, well known that the look-up speed in the FIB of a forwarding unit depends not only on HW related factors but also on the methods used in software to perform the required look-up. Look-up—here implies matching a network address such as destination IP address in packet header with information in the FIB entries. The best match to be selected is the entry with the longest matching network prefix. This longest prefix match (LPM) entry will point out information which is used in a subsequent packet processing to direct the packet towards an ultimate egress interface, i.e. where to forward the packet.

Achieving fast FIB lookup is in general known to be more difficult with a large number of entries in the FIB table and it is also well known that the problem is further aggravated when the network prefixes in the said FIB table entries vary in length, and in particular when the distribution of network prefix length variation, is fine grained and gentle.

Furthermore, in the case of IPv6, the greater allowance in variability of network prefix length, implied by the longer IPv6 address size, can only accentuate the above described FIB lookup problem in prospective network conditions such as those resulting from the exponential proliferation of IPv6 usage, in due response to the expected massive roll-out of Internet of Things (IoT), whence further demand for increased sub-netting practices may out of necessity likely arise.

The above described FIB look-up problem can be solved with specialized hardware based implementation techniques and this is typically the case how it is done in most commercial router devices.

Moreover, for use on ordinary general-purpose computing hardware, several algorithmic methods have also been proposed for a software based forwarder, that aims to improve the look-up speed in a large FIB table where the routes have varying prefix lengths.

For Example: Waldfogel et. al. [1] Scalable High Speed IP Routing Lookups; proposes a method that organizes prefixes based on fixed prefix length such that for a fixed length the entries are stored in a hash table upon which a binary search operation can be done per set of entries of same number of prefix bits; and Varghese et. al. [2] Controlled Prefix Expansion, is an example of a different method, used for faster look-up in a large FIB table with varying prefix length, that is based on expanding the prefixes.

The hardware specific, e.g. ternary content-addressable memory (TCAM) memory, solutions for fast FIB lookup which are widely used in the industry today, for example in most commercial routing appliances, do not lend themselves well for products that are meant to be universally portable across a variety of cloud deployment infrastructure.

SUMMARY

An objective of embodiments herein is to provide a mechanism that enables packet handling in an efficient manner in a communications network.

According to a first aspect the objective is achieved by providing a method performed by a network node unit for managing packet handling in a communications network. The network node unit reads through routing entries in a routing information base, and for a routing entry, i.e. each or a plurality, the network node unit masks a network address of the routing entry and performs a hash process on the masked network address into a hashed network address associated with an identity of a forwarding unit. The network node unit further sends information relating to the routing entry to the forwarding unit with the identity thereby partitioning the routing entries to different forwarding units.

According to another aspect the objective is achieved by providing a method performed by a receiving element, such as an interface element in a router, for handling packets in a communications network. The receiving element receives a packet with a network address. The receiving element masks the network address and performs a hash process on the masked network address into a hashed network address, which hashed network address is associated with an identity of a forwarding unit with information associated with partitioned routing entries of a routing information base. The receiving element further sends the received packet to the forwarding unit associated with the hashed network address.

It is furthermore provided herein a computer program product comprising instructions, which, when executed on at least one processor, cause the at least one processor to carry out any of the methods above, as performed by the network node unit or the receiving element, respectively. It is additionally provided herein a computer-readable storage medium, having stored therein a computer program product comprising instructions which, when executed on at least one processor, cause the at least one processor to carry out the method according to any of the methods above, as performed by the network node unit or the receiving element, respectively.

According to yet another aspect the objective is achieved by providing a network node unit for managing packet handling in a communications network. The network node unit is configured to read through routing entries in a routing information base, and for a routing entry, i.e. each or a plurality, the network node unit is configured to mask a network address of the routing entry and perform a hash process on the masked network address into a hashed network address associated with an identity of a forwarding unit. The network node unit is further configured to send information relating to the routing entry to the forwarding unit with the identity thereby partitioning the routing entries to different forwarding units.

According to still another aspect the objective is achieved by providing a receiving element, such as an interface element in a router, for handling packets in a communications network. The receiving element is configured to receive a packet with a network address. The receiving element is further configured to mask the network address and perform a hash process on the masked network address into a hashed network address. The hashed network address is associated with an identity of a forwarding unit with information associated with partitioned routing entries of a routing information base. The receiving element further sends the received packet to the forwarding unit associated with the hashed network address.

According to yet still another aspect the objective is achieved by providing a method and a network node comprising the network node unit according to the above, forwarding units, and the receiving element according to the above.

Since the hashed network address' are related to identities of forwarding units, and routing entries are partitioned to different forwarding units, embodiments herein provide an efficient process to find routing information in a fast and reliable manner wherein packet handling is performed more efficiently.

BRIEF DESCRIPTION OF THE DRAWINGS

Embodiments will now be described in more detail in relation to the enclosed drawings, in which.

DETAILED DESCRIPTION

Figure 1A:
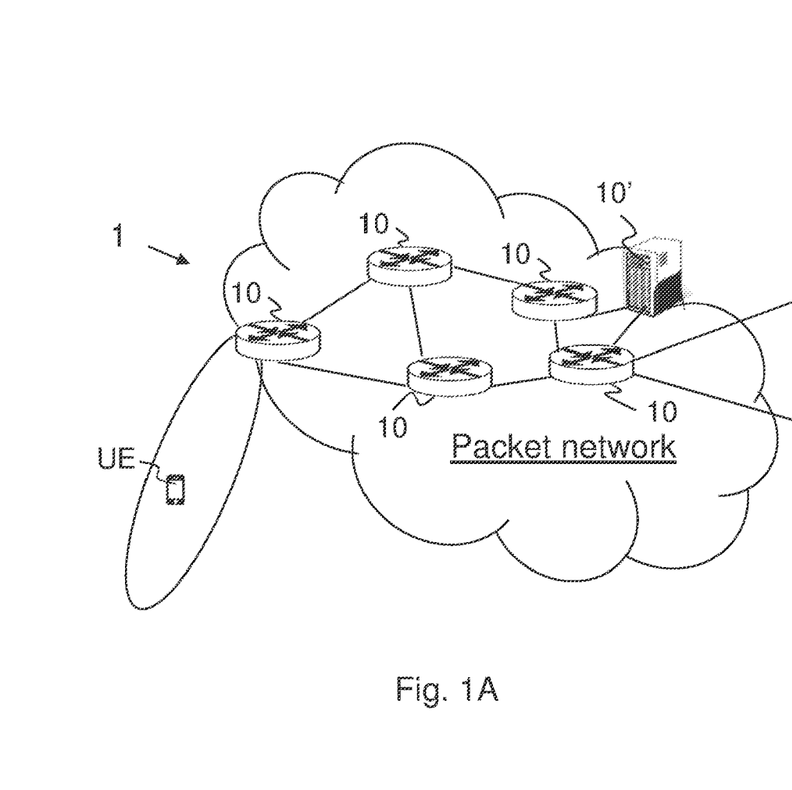
FIG. 1A shows a schematic overview depicting a communications network.
Figure 1B:
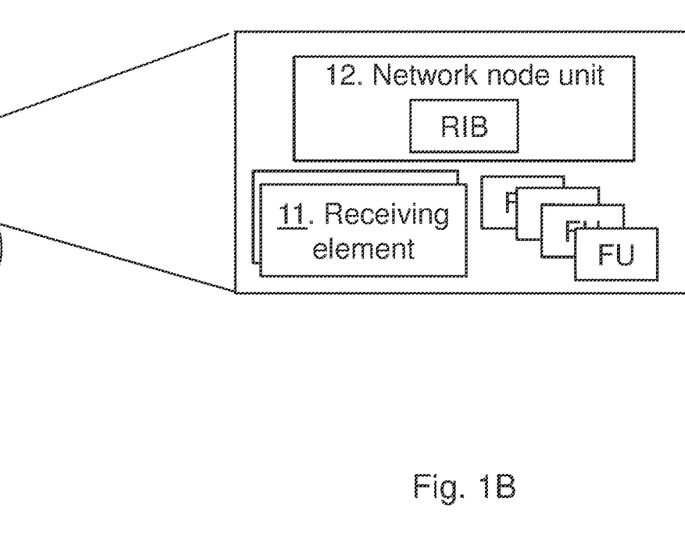
FIG. 1B shows a network node according to embodiments herein.

Communications networks such as packet transport networks face many challenges. The communications networks should be easy to operate, plug and play and be as automatic as much as possible. FIG. 1A is a schematic overview depicting a communications network 1 according to embodiments herein. The communications network 1 comprises a plurality of network nodes 10. Packets are transported over the communications network to or from e.g. a user equipment (UE) and via the network nodes to a destination network node 10' to e.g. a destination node via a number of possible routes. A network node may comprise a number of element or units for handling packets. FIG. 1B shows a schematic block diagram depicting a network node that comprises a network node unit 12 comprising a RIB. The network node 10 may further comprise a number of forwarding units, FU, comprising a FIB and one or more receiving elements 11 also referred to as interface elements. The network nodes 10 may be any type of router, switch, or any node with a scheduler or a packet handler transporting one or more packets within the communications network 1. In FIG. 1B the network node unit 12, the receiving element 11 and the multiple FUs are collocated within one network node e.g. on a same hardware. It should however be noted that the different units and elements may be distributed over different parts of different hardware in e.g. a distributed node manner being part of a same or different network nodes or server hardware.

With a trend towards more demand for routing systems being implemented on ordinary general purpose central processing unit (CPU) hardware for easier deployment in different virtualized cloud environments the need arise for distributed software based solutions that also address the issues of "FIB explosion" latency.

The prior art methods for achieving a fast FIB lookup on an ordinary computer, for example Varghese et. al, are primarily concerned with a single computer FIB, whereas a distributed routing system is herein provided with multiple forwarding units on separate computers. However, the method disclosed herein may be combined with some prior art methods used for a fast FIB lookup on a single computer.

According to embodiments herein the network node unit 12 reads through routing entries, e.g. a set of routing entries, in the routing information base (RIB). For one or each routing entry, the network node unit 12 masks a network address, e.g. destination address, of the routing entry and performs a hash process on the network address of the routing entry into a hashed network address associated with an identity of a forwarding unit. The network node unit 12 then sends information relating to the routing entry to the forwarding unit with the identity thereby partitioning the routing entries to different forwarding units. Thus, each FU will comprise a FIB of reduced size in terms of routing entries compared to the RIB. Packets received at the receiving element 11 are then forwarded to the corresponding FU for a fast FIB look-up.

Thus, embodiments herein enable a distributed routing system with multiple forwarding units with an enhanced forwarding capacity also in an ordinary datacenter setup, that is, in a deployment that is just using general purpose computing hardware, and hosting said routing system, for example, in a virtualized cloud computing environment. An advantage is that embodiments herein are easily portable across different computing infrastructures since no specialized hardware is required to achieve the scalable and enhanced forwarding capacity for the deployed routing system.

Figure 2:
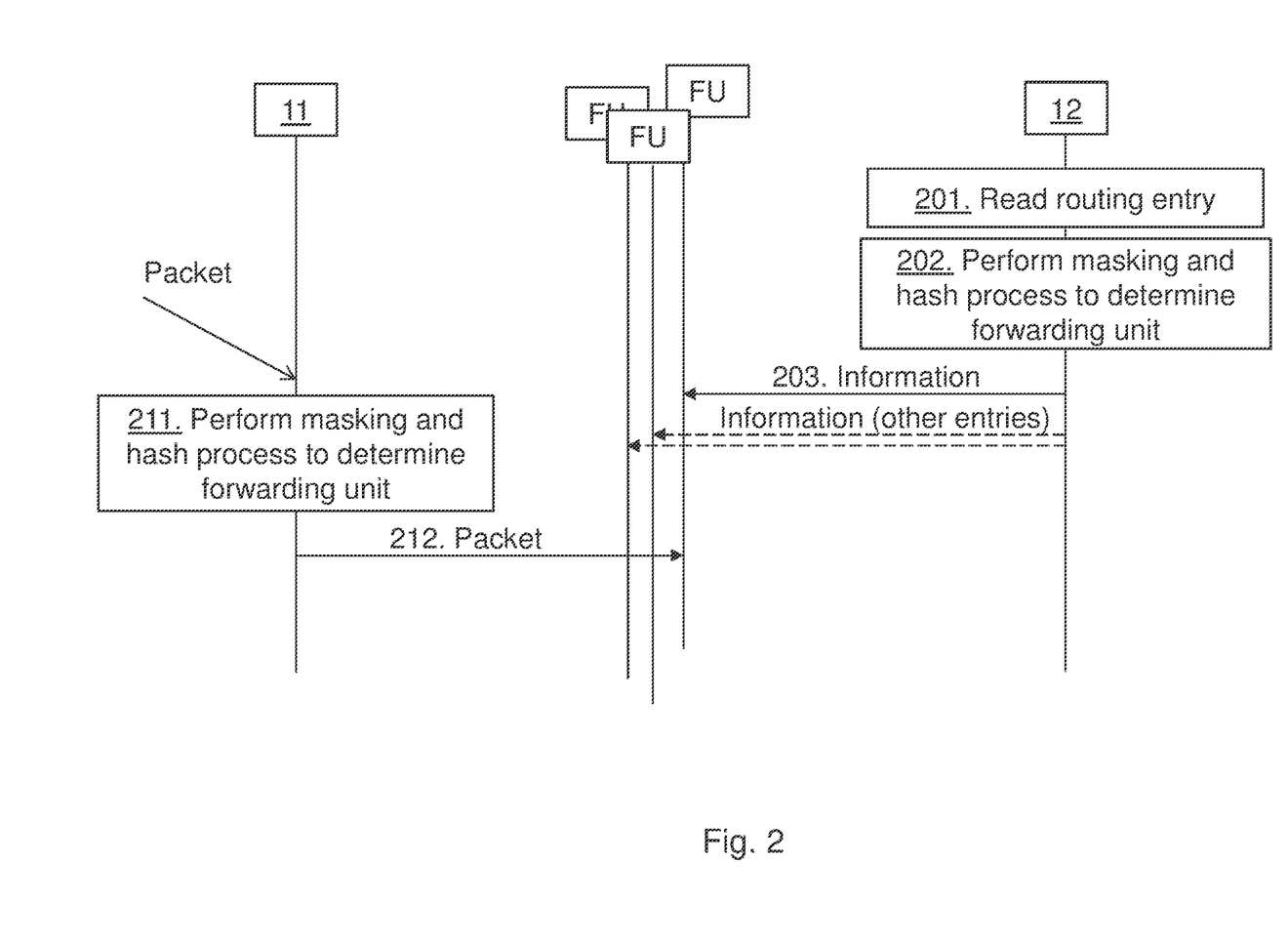
FIG. 2 shows a combined signalling scheme and flowchart according to embodiments herein.

FIG. 2 is a combined signalling scheme and flowchart disclosing some embodiments of the solution disclosed herein.

Action 201. The network node unit 12 may configure the different forwarding units (FU) with different parts of the RIB. The network node unit 12 reads each routing entry in the RIB e.g. the network node unit 12 may read each or a set of routing entries in the RIB.

Action 202. For one or more routing entries, the network node unit 12 masks e.g. a destination address of the routing entry and then performs a hash process to determine which forwarding unit to select for the routing entry. E.g. the network node unit 12 performs the hash process on the masked destination address of the routing entry into the hashed destination address associated with the identity of a forwarding unit.

Action 203. The network node unit 12 then forwards or sends information relating to the routing entry to the forwarding unit with the identity. Thus, the network node unit 12 sends information of other entries to other forwarding units and thereby partitions the routing entries to different forwarding units.

Action 211. According to some embodiments herein an interface receiving a packet denoted as the receiving element 11 may forward the packet to a certain FU for a fast FIB lookup. Thus, the receiving element 11 receives a packet with e.g. a destination address, masks the destination address and performs the hash process on the destination address into the hashed destination address. The hashed destination address represents the forwarding unit with the information associated with partitioned routing entries of the RIB i.e. the identity of the forwarding unit may e.g. be calculated from the hashed destination address.

Action 212. The receiving element 11 then sends the received packet to the forwarding unit associated with the hashed destination address. Thus, the receiving element 11 may send packets of other destination addresses to other forwarding units.

Figure 3:
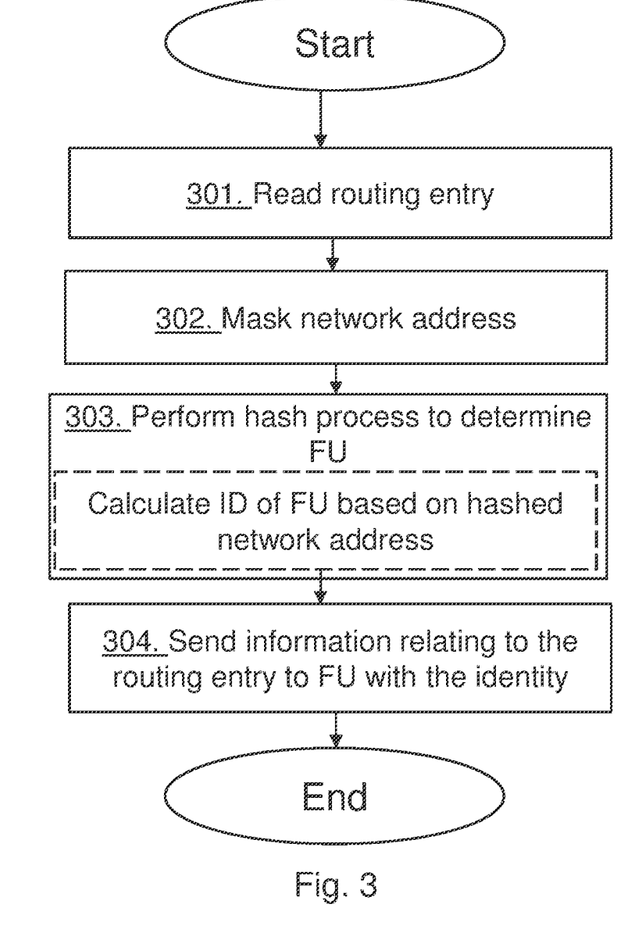
FIG. 3 shows a schematic flowchart depicting a method performed by a network node unit according to embodiments herein.

The method actions performed by the network node unit 12 for managing packet handling in the communications network according to embodiments herein will now be described with reference to a flowchart depicted in FIG. 3. The actions do not have to be taken in the order stated below, but may be taken in any suitable order. Actions performed in some embodiments are marked with dashed boxes.

Action 301. The network node unit 12 reads through routing entries in a routing information base.

Action 302. For a routing entry, i.e. for each routing entry or a number of routing entries, the network node unit 12 masks the network address, such as a network prefix, a target address, a source and/or a destination address. The network node unit 12 may mask the network address using a set masking sequence e.g. a DCRM mask of 8, 16, 24 or 28 bits. The length and/or the values of the masking sequence may be dynamically adjusted due to e.g. length of network address or network address prefix.

Action 303. The network node unit 12 performs the hash process on the masked network address of the routing entry into the hashed network address associated with the identity of a forwarding unit. The network node unit 12 may further calculate the identity of the forwarding unit based on the hashed network address. The hash process may be taking a value representing number of forwarding units into account.

Action 304. The network node unit 12 sends information relating to the routing entry to the forwarding unit with the identity thereby partitioning the routing entries to different forwarding units. E.g. the network node unit 12 may send the information to the forwarding unit with the calculated identity. The information sent is one or more of the following: the routing entry; information derived from the routing entry; and data related to the routing information e.g. metric, interface, origin of information, and/or learnt information.

Figure 4:
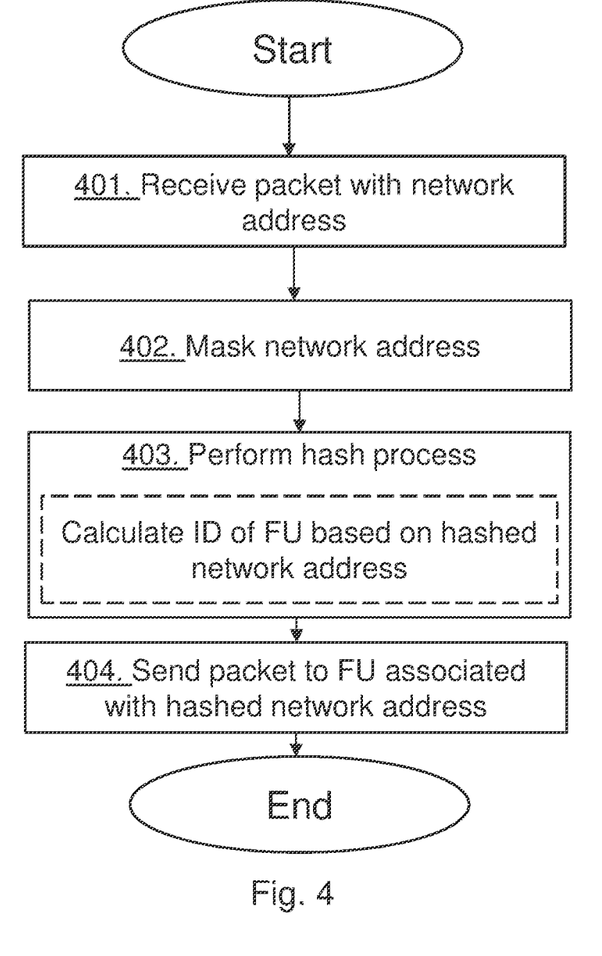
FIG. 4 shows a schematic flowchart depicting a method performed by a receiving element according to embodiments herein.

The method actions performed by the receiving element 11 for managing packets in the communications network 1 according to embodiments herein will now be described with reference to a flowchart depicted in FIG. 4. The actions do not have to be taken in the order stated below, but may be taken in any suitable order. Actions performed in some embodiments are marked with dashed boxes.

Action 401. The receiving element 11 receives a packet with a network address e.g. a destination address and/or a source address.

Action 402. The receiving element 11 masks the network address of the packet. The receiving element 11 may mask the network address using the set masking sequence.

Action 403. The receiving element 11 performs the hash process on the masked network address into the hashed network address, which hashed network address is associated with the identity of the forwarding unit with information associated with partitioned routing entries of the routing information base. Thus, the hashed network address represents the forwarding unit with information associated with partitioned routing entries of the RIB. The receiving element 11 may calculate the identity of the forwarding unit based on the hashed network address. The hash process may take a value representing number of forwarding units into account.

Action 404. The receiving element 11 sends the received packet to the forwarding unit associated with the hashed network address. E.g. the packet may be sent to the forwarding unit with the calculated identity.

According to embodiments herein RIB information for a routing system with multiple FUs, also denoted as Forwarding Elements (FE), is per FU reduced in volume by an information reduction step which reduces the information volume to be matched in a FIB lookup.

The reduction step, i.e. to reduce the number of routing entries in a FIB denoted as a reduced FIB, may be done for the route information corresponding to each entry in the RIB in the following way: The output result of the hash process points out, the individual FU hosting the reduced-FIB to which route entry information from said RIB should be down-loaded to.

Said hash operation may use as one or more input parameters for its calculating task, wherein the one or more input parameter may be based on least the following two arguments:

First argument: the resulting value of a masking operation, wherein;
the prefix address information of a route in a RIB entry, is bit-wise, masked out with a Distribution Correlated Reduction Mask (DCRM). See below examples.

| Network prefix | Prefix size | (Netmask) | Forwarding information |
|---|---|---|---|
| 192.168.1.0 | /24 | (255.255.255.0) | A |
| 10.1.0.0 | /16 | (255.255.0.0) | B |

Example RIB Information for Two Entries

| DCRM | Binary notation |
|---|---|
| DCRM(size = 28) | 11111111111111111111111111110000 |

DCRM Example

Second argument: A value representing the total number of FEs in the routing system.

The DCRM mask may in size, i.e. length, encompass an entire Network Prefix, or part thereof, but may also in size extend beyond the length of the Network Prefix. See figures below.

| | | | | | | | | |
|---|---|---|---|---|---|---|---|---|
| Network prefix (decimal dot) | 192 | 168 | 1 | 0 | 10 | 1 | 0 | 0 |
| Network prefix (binary) | 11000000101010000000000100000000 | | | | 00001010000000010000000000000000 | | | |
| DCRM(size = 28) | 11111111111111111111111111110000 | | | | 11111111111111111111111111110000 | | | |
| Network prefix AND DCRM(size = 28) | 11000000101010000000000100000000 | | | | 00001010000000010000000000000000 | | | |

! The above shows network prefix information masked out with DCRM !

One Example with DCRM of Size 28

| | | | | | | | | |
|---|---|---|---|---|---|---|---|---|
| Network prefix (decimal dot) | 192 | 168 | 1 | 0 | 10 | 1 | 0 | 0 |
| Network prefix (binary) | 11000000101010000000000100000000 | | | | 00001010000000010000000000000000 | | | |
| DCRM(size = 24) | 11111111111111111111111100000000 | | | | 11111111111111111111111100000000 | | | |
| Network prefix AND DCRM(size = 24) | 11000000101010000000000100000000 | | | | 00001010000000010000000000000000 | | | |
| DCRM(size = 18) | 11111111111111111100000000000000 | | | | 11111111111111111100000000000000 | | | |
| Network prefix AND DCRM(size = 18) | 11000000101010000000000000000000 | | | | 00001010000000010000000000000000 | | | |

Two Examples with DCRM Set to Two Different Sizes

Figure 5:
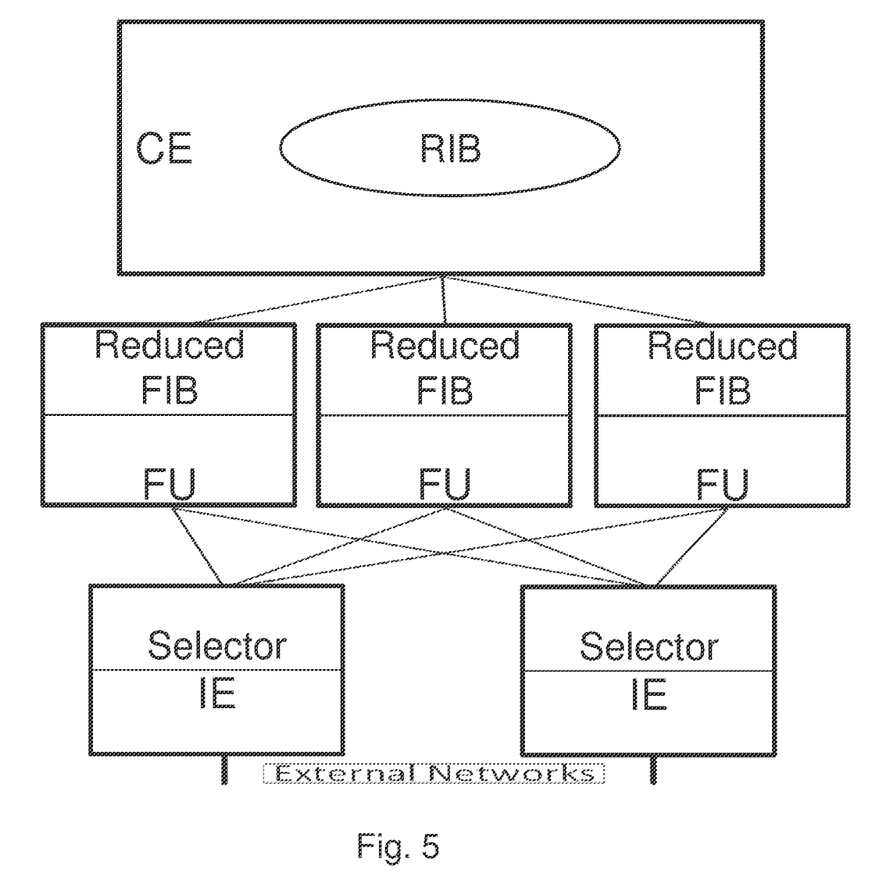
FIG. 5 shows a schematic overview depicting a network node according to embodiments herein.

FIG. 5 illustrates a schematic implementation of some embodiments herein deployed in a network node. When a packet arrives at an Interface Element (IE) i.e. the receiving element 11, a Selector Function (SF) selects a Forwarding Element (FE), i.e. forwarding unit, to which the packet is dispatched. The selection is done so that the packet flow to a selected FE in the typical case corresponds with forwarding information to be found, in the reduced information set of this selected reduced FIB, stored locally on this selected FE.

The selection of FE may be done on the IE by first masking the IP destination address in the packet header of the arriving packet with the DCRM mask. Thereafter, this masked out result may be provided as a first input parameter, that is the masked network address, to a selection function, together with a second parameter that here equals the total number of FEs in the routing system, so that both parameters are then jointly processed to calculate the identity of the FE.

The hash operations, which are to be applied on the IEs and applied to the network address emanating from the RIB and down-loaded to the FEs for the reduced FIBs, are to be congruent, that is, will for the same given input parameters point out the same FE.

The length of the mask such as a DCRM mask is a global configuration parameter for the routing system that can be set to best achieve a compromise in balance between the ratio of typical (high-volume) reduced FIB look-up cases and the exceptional (low-volume) non-reduced FIB look-up cases, to provide an over-all best forwarding performance that aligns with the desired traffic characteristics of different real world network deployment scenarios.

In FIG. 5 the routing information such as routing entries are held in a RIB on a Control Element (CE), i.e. the network node unit 12, from where information relating to respective routing entries is down-loaded to a set of FEs, each having at least an own FIB where at least one of said FIBs have been reduced with respect to FIB look-up search volume.

Each interface to the external networks from which packets arrive (and possibly leave) may be associated with an IE. Each IE contains a selector function which for incoming packet traffic selects the FE where each packet is to be processed and thereafter the IE dispatches the packet to this selected FE. In this way, the selector distributes the incoming IP packet traffic to the FEs of the distributed routing system.

In an exemplary embodiment of the described routing system, for the set of routing entries in the RIB, a subset of route entries (the typical case) are marked as eligible for FIB search volume reduction, whereas some RIB route entries (exceptional cases), for example, the default route may be exempt from FIB search volume reduction and therefore not marked as eligible. Non eligible network address may be network address prefixes of a shorter length than the masking sequence causing the hashing process to establish an ambiguous identity of FEs.

For a multitude of eligibly marked IP routes with varying prefix lengths stored in the RIB, the corresponding FIB search volume for each forwarder is reduced in the following way:

Each forwarding element in a set of FEs may be labeled with a natural number, for example, 1, 2, 3 in a set of 3 FEs as shown in FIG. 5.

For each eligibly marked IP route entry in said RIB, a binary IP address data of the network prefix in route information is masked with the DCRM mask through a boolean AND operation. The result, i.e. the masked network address, is thereafter hashed over the amount of forwarding elements in this set of FEs, such that a FE, within the set of FEs, is selected. For this selected FE, the data, of said IP route entry in RIB, i.e. routing entry used in the masking operation, is chosen to be down-loaded to the reduced FIB, of this specific FE, i.e. down-loaded to the forwarding element which was selected as a result of the hashing operation.

This way the reduced FIB on each FE will cover a different part of the total forwarding information, which is emanating from the RIB. Furthermore, the distribution of incoming packets on IEs will be correlated with a particular FE and reduced FIB in the following way:

As an IP packet from the external networks arrives on an interface of the IE the selector function on the IE selects an FE to dispatch the packet to for the ensuing forwarding tasks which require a FIB lookup.

In the typical case a match would be found in the reduced FIB, but in the exceptional cases when a match is not found then a secondary lookup in either the RIB at the network node unit 12 or a corresponding non-reduced FIB on the FE may be performed.

Embodiments herein may particularly be suitable for realization in cloud computing environments, for example, a distributed routing system deployed in an ordinary datacenter with general purpose computing hardware.

The FEs in e.g. FIG. 5 with reduced FIBs are in a computing cloud preferably to be deployed on separate network nodes for best forwarding capacity. That is, one FE per network node. The IEs with Selectors can be collocated with FEs or be deployed on separate network nodes. One or more FEs may be deployed on the same network node. Several IEs may be deployed on the same network node. All parts relevant to the embodiments herein such as FUs, IEs (and also the CE) may all be virtualized.

It should be noted that in some multicore processing hardware architectures with compartmentalized resource allocation possibilities a plurality of FEs can in many cases be allocated to the same network node with good forwarding capacity results.

Figure 6:
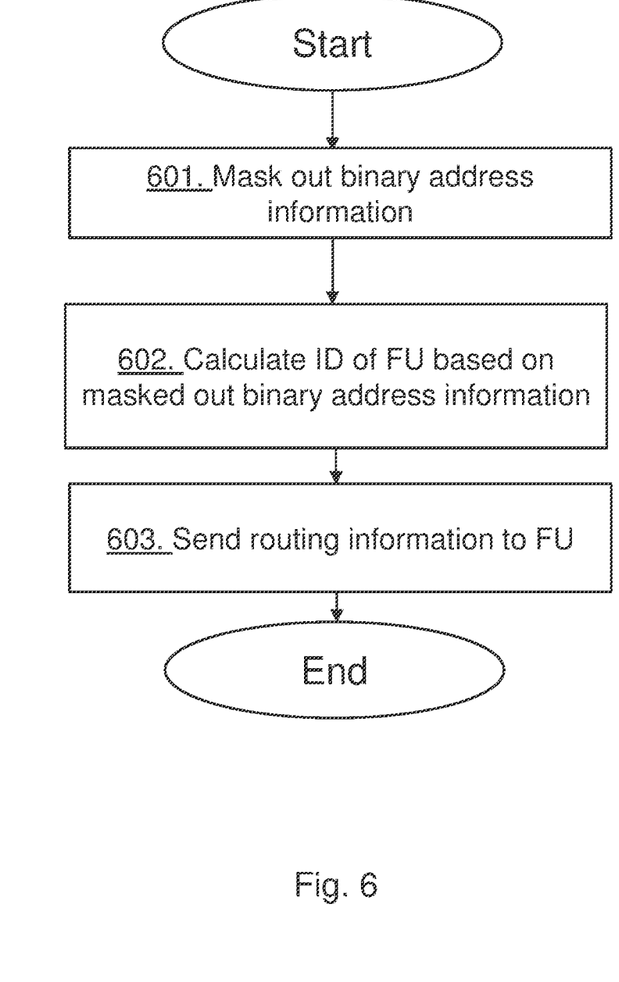
FIG. 6 shows a schematic flowchart according to embodiments herein.

FIG. 6 is a schematic flowchart of an exemplary embodiment for creation of reduced FIBs in different FUs such as different network nodes or processors.

Action 601. For each routing entry in a RIB, the network node unit 12 may mask out binary address information in the routing entry with the DCRM mask.

Action 602. The network node unit 12 may, based on the masked out binary address information and number of FUs in the system, calculate the ID of the FU with reduced FIB to receive a download of this route entry information.

Action 603. The network node unit 12 may send this routing information or information derivable from the routing information to the selected FU. This will result in a reduced FIB on each FU. Different parts of the RIB information will be downloaded to different FUs.

Figure 7:
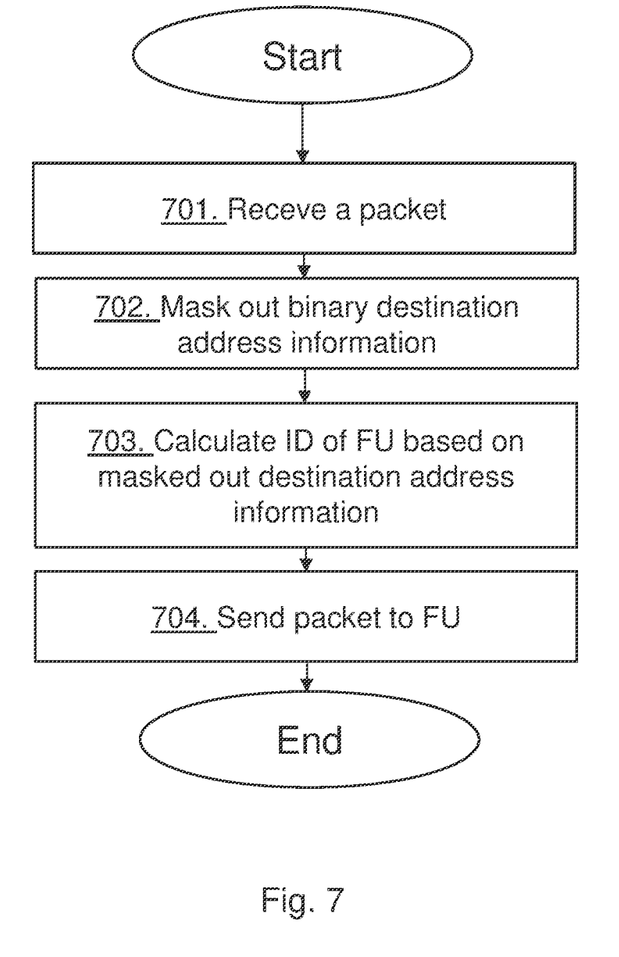
FIG. 7 shows a schematic flowchart according to embodiments herein.

FIG. 7 is a schematic flowchart disclosing an exemplary embodiment of a method performed for each packet arriving on an interface of the receiving element 11.

Action 701. The receiving element 11 may receive the packet.

Action 702. The receiving element 11 may mask out the binary destination address information in the packet header with the DCRM mask.

Action 703. The receiving element 11 may, based on the masked out destination address information and the number of FUs in the system, calculate the ID of the FU to receive the packet.

Action 704. The receiving element 11 may send the packet to the FU with the calculated ID and the packet arrives on the selected FU for a FIB look-up.

Existing technology for software distributed forwarding of packets does not combine the effects of (i) a per forwarder specific reduced FIB lookup volume, with (ii) a correlated distribution of the traffic flows to the forwarding unit holding said specific reduced lookup volume. Since a lookup in a reduced FIB is faster than in a non-reduced FIB (which is tantamount to a global FIB that would encompass all forwarding information down-loaded from the RIB), forwarding of IP packet traffic will become faster in the typical correlated distribution case.

For a RIB containing a large amount of routing entries with a distribution of prefix lengths, representative of real-world network scenarios, the effect of embodiments herein becomes significant.

In an embodiment herein, the combined effect is achieved by using a common address information mask, here denoted as the Distributed Correlation Reduction Mask (DCRM), both as parameter for reducing the common RIB information on each forwarding unit into a reduced lookup volume and as a parameter for achieving the hash based distribution of traffic flows, to the FUs which are hosting reduced FIBs.

The selection may be done by first masking the binary destination IP address in the packet header with the DCRM mask in a boolean AND operation, whereafter the result of this AND operation is hashed over the amount of FEs, such that a particular FE is selected.

For example:
SelectFE(IP_Destination, Number_of_FEs, DCRM)
Begin
    return    ((hash((IP_Destination)    AND    (DCRM))
MODULO Number_of_FEs)+1)
End;

It should be noted that in the above code example, the offset "+1" is added just to correspond with the simple enumeration of FEs as 1,2,3, for example in a case similar to FIG. 5. Other enumeration schemes may be used in other realizations.

Figure 8:
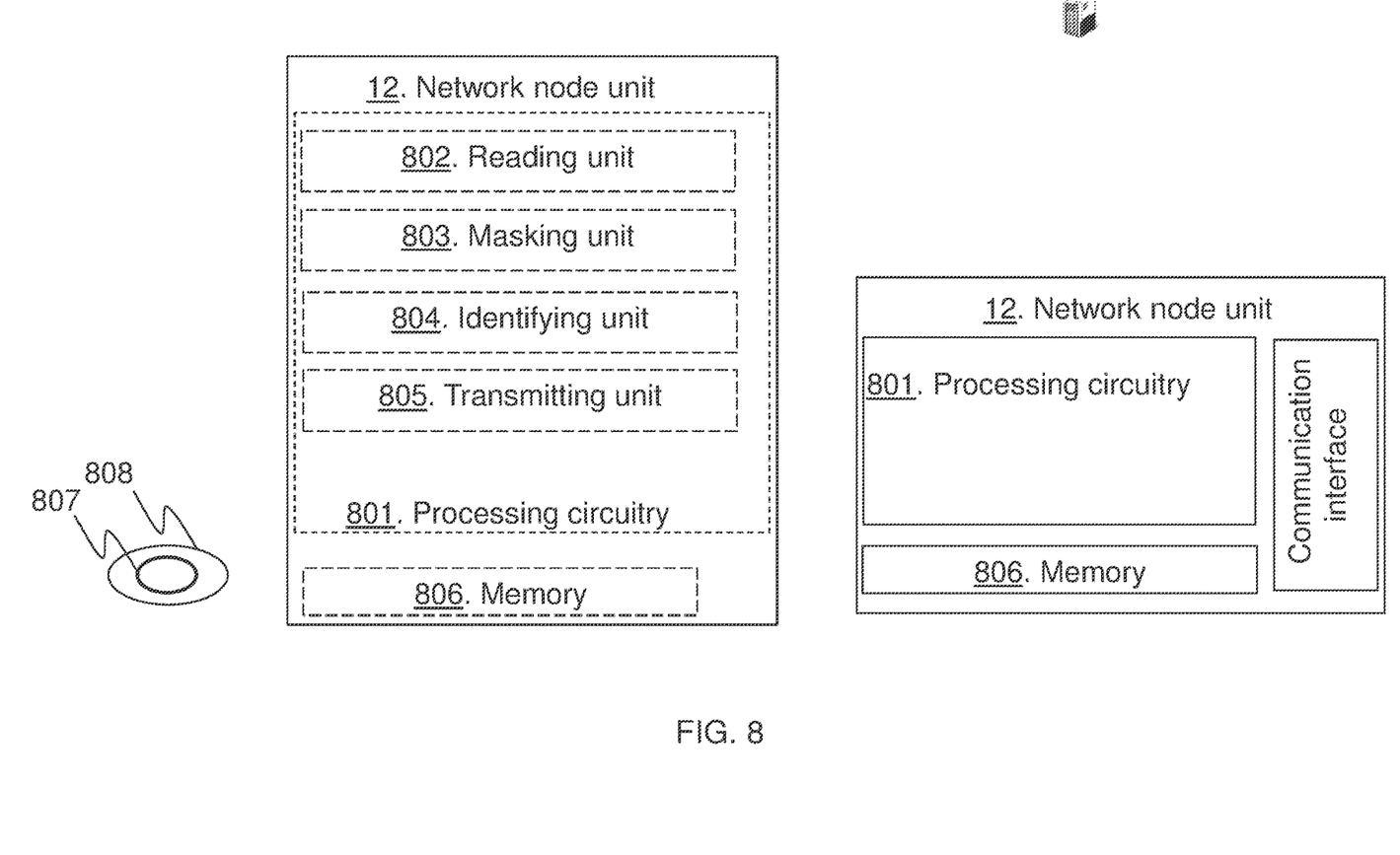
FIG. 8 shows a block diagram depicting a network node unit according to embodiments herein.

Embodiments herein provide the network node unit 12 configured to perform the methods described above. FIG. 8 discloses the network node unit 12 for managing handling of packets in the communications network 1 in a block diagram manner in two embodiments.

The network node unit 12 such as a router or server with a RIB, may comprise processing circuitry 801, e.g. one or more processors, configured to perform the methods herein.

The network node unit 12 may comprise a reading unit 802. The network node unit 12, the processing circuitry 801 and/or the reading unit 802 is configured to read through routing entries in the RIB.

The network node unit 12 may comprise a masking unit 803. For one, a set of, or all routing entries, the network node unit 12, the processing circuitry 801 and/or the masking unit 803 is configured to mask the network address of the routing entry. The network node unit 12, the processing circuitry 801 and/or the masking unit 803 may be configured to mask the network address using the set masking sequence.

The network node unit 12 may comprise a identifying unit 804. The network node unit 12, the processing circuitry 801 and/or the identifying unit 804 is configured to perform the hash process on the masked network address of the routing entry into the hashed network address associated with the identity of the FU. The network node unit 12, the processing circuitry 801 and/or the identifying unit 804 may be configured to calculate the identity of the FU based on the hashed network address. The network node unit 12, the processing circuitry 801 and/or the identifying unit 804 may be configured to perform the hash process taking the value representing number of FUs into account.

The network node unit 12 unit may comprise a transmitting unit 805, e.g. a transmitter or transceiver. The network node unit 12, the processing circuitry 801 and/or the transmitting unit 805 is configured to send the information relating to the routing entry to the FU with the identity thereby partitioning the routing entries to different FUs. The network node unit 12, the processing circuitry 801 and/or the transmitting unit 805 may be configured to send the information to the FU with the calculated identity. The information sent may be one or more of the following: the routing entry; information derived from the routing entry; and data related to the routing information.

The network node unit 12 further comprises a memory 806. The memory comprises one or more units to be used to store data on, such as mask, identities of FUs, routing information and entries, hash function, applications to perform the methods disclosed herein when being executed, and similar. Thus, the network node unit 12 may comprise the processing circuitry and the memory, said memory comprising instructions executable by said processing circuitry whereby said network node unit is operative to perform the methods herein. The network node unit 12 may comprise a communication interface comprising a transmitter, a receiver, a transceiver and/or one or more antennas.

The methods according to the embodiments described herein for the network node unit 12 are respectively implemented by means of e.g. a computer program product 807 or a computer program, comprising instructions, i.e., software code portions, which, when executed on at least one processor, cause the at least one processor to carry out the actions described herein, as performed by the network node unit 12. The computer program product 807 may be stored on a computer-readable storage medium 808, e.g. a disc, a universal serial bus (USB) stick, or similar. The computer-readable storage medium 808, having stored thereon the computer program product 807, may comprise the instructions which, when executed on at least one processor, cause the at least one processor to carry out the actions described herein, as performed by the network node unit 12. In some embodiments, the computer-readable storage medium may be a non-transitory or a transitory computer-readable storage medium.

Figure 9:
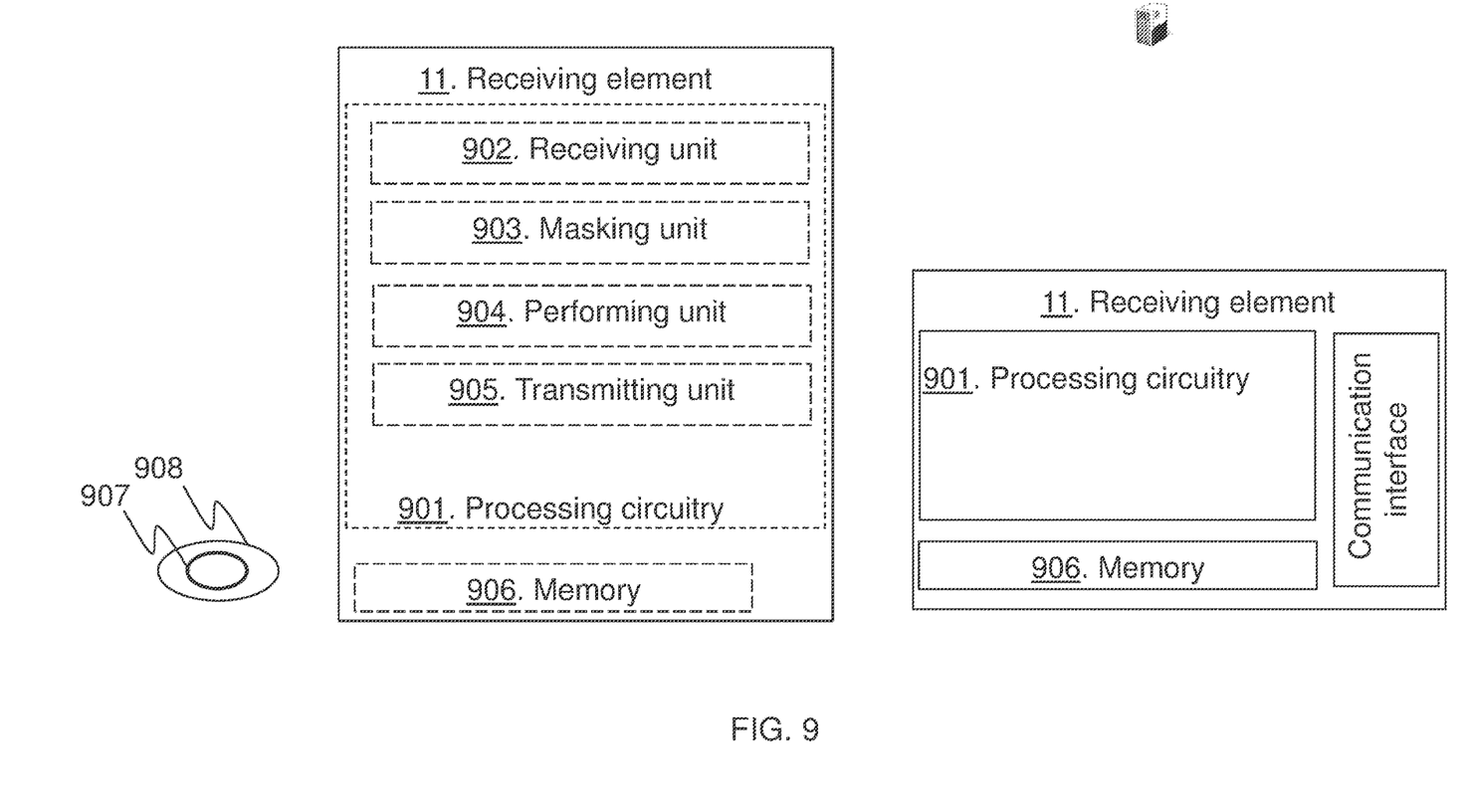
FIG. 9 shows a block diagram depicting a receiving element according to embodiments herein.

In order to perform the methods herein the receiving element 11, such as an interface element in the network node, is provided and configured to perform the methods herein. FIG. 9 shows a block diagram depicting the receiving element according to embodiments herein for managing packets in the communications network 1 e.g. when receiving a packet from a network node 10 or a UE.

The receiving element 11 in e.g. a router or server with e.g. an IE, may comprise processing circuitry 901, e.g. one or more processors, configured to perform the methods herein.

The receiving element 11 may comprise a receiving unit 902, e.g. a receiver or transceiver. The receiving element 11, the processing circuitry 901 and/or the receiving unit 902 is configured to receive the packet with the network address such as a destination address in a header.

The receiving element 11 may comprise a masking unit 903. The receiving element 11, the processing circuitry 901 and/or the masking unit 903 is configured to mask the network address of the packet.

The receiving element 11 may comprise a performing unit 904. The receiving element 11, the processing circuitry 901 and/or the performing unit 904 is configured to perform the hash process on the masked network address into the hashed network address, which hashed network address is associated with the identity of the FU with information associated with partitioned routing entries of the routing information base.

The receiving element 11 may comprise a transmitting unit 905, e.g. a transmitter or transceiver. The receiving element 11, the processing circuitry 901 and/or the transmitting unit 905 is configured to send the received packet to the FU associated with the hashed network address.

The receiving element 11, the processing circuitry 901 and/or the performing unit 904 may be configured to calculate the identity of the FU based on the hashed network address, and wherein the receiving element 11, the processing circuitry 901 and/or the transmitting unit 905 may be configured to send the packet to the FU with the calculated identity.

The receiving element 11, the processing circuitry 901 and/or the masking unit 903 may be configured to mask the network address using the set masking sequence.

The receiving element 11, the processing circuitry 901 and/or the performing unit 904 may be configured to perform the hash process taking the value representing number of FUs into account.

The receiving element 11 further comprises a memory 906. The memory comprises one or more units to be used to store data on, such as mask, identities of FUs, routing information and entries, hash function, applications to perform the methods disclosed herein when being executed, and similar. Thus, the receiving element 11 may comprise the processing circuitry and the memory, said memory comprising instructions executable by said processing circuitry whereby said receiving element is operative to perform the methods herein. The receiving element 11 may comprise a communication interface comprising a transmitter, a receiver, a transceiver and/or one or more antennas.

The methods according to the embodiments described herein for the receiving element 11 are respectively implemented by means of e.g. a computer program product 907 or a computer program, comprising instructions, i.e., software code portions, which, when executed on at least one processor, cause the at least one processor to carry out the actions described herein, as performed by the receiving element 11. The computer program product 907 may be stored on a computer-readable storage medium 908, e.g. a disc, a universal serial bus (USB) stick, or similar. The computer-readable storage medium 908, having stored thereon the computer program product 907, may comprise the instructions which, when executed on at least one processor, cause the at least one processor to carry out the actions described herein, as performed by the receiving element 11. In some embodiments, the computer-readable storage medium may be a non-transitory or a transitory computer-readable storage medium.

Alternatively, several of the functional elements or units of the processor/s or processing circuits discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance tradeoffs inherent in these design choices.

It should be noted that some embodiments herein disclose a network node, e.g. network node 10, comprise the network node unit according to embodiments herein, multiple forwarding units and the receiving element according to embodiments herein. Furthermore is it disclosed a method performed by the network node for handling packets in a communications network.

It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the embodiments herein are limited only by the following claims and their legal equivalents.

The invention claimed is:

1. A method performed by a network node circuit for managing packet handling in a communications network, the method comprising:
reading through routing entries in a routing information base, and for a routing entry:
masking a network address of the routing entry, wherein the masking is performed using a set masking sequence;
performing a hash process on the masked network address of the routing entry into a hashed network address associated with an identity of a forwarding unit, wherein performing the hash process comprises calculating the identity of the forwarding unit based on a first input parameter that is the hashed network address and a second input parameter that represents a total number of forwarding units available for routing;
determining whether the routing entry is eligible for storage in a reduced forwarding information base (FIB) search volume based on the hash process; wherein the routing entry fails to be eligible when the hash process calculation is unable to associate an identity with a forwarding unit;
marking the routing entry as eligible for storage in the FIB search volume reduction responsive to determining that the routing entry is eligible for storage in the FIB search volume reduction; and
sending information relating to the routing entry to the forwarding unit with the identity responsive to determining the routing entry is eligible for storage in the FIB search volume reduction, thereby partitioning the routing entries to different forwarding units.

2. The method according to claim 1, wherein the information is sent to the forwarding unit with the calculated identity.

3. The method according to claim 1, wherein the set masking sequence is a DORM mask of one of 8, 16, 24, or 28 bits.

4. The method according to claim 1, wherein the information sent is one or more of the following: the routing entry; information derived from the routing entry; and data related to the routing information.

5. A method performed by a receiving circuit for managing packets in a communications network, the method comprising:
receiving a packet with a network address;
masking the network address of the packet, wherein the masking is performed using a set masking sequence;
performing a hash process on the masked network address into a hashed network address, wherein the hashed network address is associated with an identity of a forwarding unit with information associated with partitioned routing entries of a routing information base, wherein performing the hash process comprises calculating the identity of the forwarding unit based on a first input parameter that is the hashed network address and a second input parameter that represents a total number of forwarding units available for routing; and
sending the received packet to the forwarding unit associated with the hashed network address.

6. The method according to claim 5, wherein the packet is sent to the forwarding unit with the calculated identity.

7. The method according to claim 5, wherein the set masking sequence is a DORM mask of one of 8, 16, 24, or 28 bits.

8. A computer program product comprising a non-transitory computer readable medium storing instructions which, when executed on at least one processor,
cause the at least one processor to carry out the method according to claim 1 performed by a network node unit circuit.

9. A network node circuit comprising one or more processors for managing packet handling in a communications network, wherein the network node circuit is configured to:
read through routing entries in a routing information base, and for a routing entry:
mask a network address of the routing entry, using a set masking sequence;
perform a hash process on the masked network address of the routing entry into a hashed network address associated with an identity of a forwarding unit, wherein the hash process comprises calculating the identity of the forwarding unit based on a first input parameter that is the hashed network address and a second input parameter that represents a total number of forwarding units available for routing;
determining whether the routing entry is eligible for storage in a reduced forwarding information base (FIB) search volume based on the hash process wherein the routing entry fails to be eligible when the hash process calculation is unable to associate an identity with a forwarding unit;
mark the routing entry as eligible for storage in the FIB search volume reduction responsive to determining that the routing entry is eligible for storage in the FIB search volume reduction; and
send information relating to the routing entry to the forwarding unit with the identity responsive to determining the routing entry is eligible for storage in the FIB search volume reduction, thereby partitioning the routing entries to different forwarding units.

10. The network node circuit according to claim 9, wherein the network node circuit is further configured to send the information to the forwarding unit with the calculated identity.

11. The network node circuit according to claim 9, wherein the set masking sequence is a DORM mask of one of 8, 16, 24, or 28 bits.

12. The network node circuit according to claim 9, wherein the information sent is one or more of the following: the routing entry; information derived from the routing entry; and data related to the routing information.

13. A receiving circuit comprising one or more processors for managing packets in a communications network, wherein the receiving circuit is configured to:
receive a packet with a network address;
mask the network address of the packet, using a set masking sequence;

perform a hash process on the masked network address into a hashed network address, wherein the hashed network address is associated with an identity of a forwarding unit with information associated with partitioned routing entries of a routing information base, wherein performing the hash process comprises calculating the identity of the forwarding unit based on a first input parameter that is the hashed network address and a second input parameter that represents a total number of forwarding units available for routing; and send the received packet to the forwarding unit associated with the hashed network address.

14. The receiving circuit according to claim 13, wherein the receiving circuit is configured to send the packet to the forwarding unit with the calculated identity.

15. The receiving circuit according to claim 13, wherein the set masking sequence is a DORM mask of one of 8, 16, 24, or 28 bits.

* * * * *